United States Patent [19]

Ozaki

[11] 4,277,077
[45] Jul. 7, 1981

[54] VARIABLE-SPEED BICYCLE

[75] Inventor: Nobuo Ozaki, Osaka, Japan

[73] Assignee: Maeda Industries, Ltd., Osaka, Japan

[21] Appl. No.: 51,396

[22] Filed: Jun. 25, 1979

[30] Foreign Application Priority Data

Jul. 5, 1978 [JP] Japan .................................. 53-82340
Jul. 5, 1978 [JP] Japan ............................. 53-93247[U]

[51] Int. Cl.³ ....................... B62M 9/12; B62M 25/04
[52] U.S. Cl. ....................................... 280/236; 474/80
[58] Field of Search .................. 280/236, 238, 289 G; 74/217 B, 611; 474/80, 79, 78

[56] References Cited

FOREIGN PATENT DOCUMENTS 848964 11/1939 France ..................................... 280/236
439540 12/1935 United Kingdom .................. 74/217 B
509793 7/1939 United Kingdom ..................... 280/236

Primary Examiner—John A. Pekar

Attorney, Agent, or Firm—Birch, Stewart, Kolasch & Birch

[57] ABSTRACT

A variable-speed bicycle comprises a multi-stage freewheel assembly with two or three sprockets mounted on a rear wheel hub, a rear derailleur is adapted to cooperate with the freewheel assembly for switching over a chain from one sprocket onto another, and an action converter is provided for converting a tension force of one direction into a thrust force of a transverse direction thereto. The derailleur comprising a horizontal support shaft mounted to a bracket, a tensioner mounted on the shaft, and a helical spring surrounding the shaft and interposed between the tensioner and the bracket. The tensioner is axially slidable on the shaft as well as rotatable about the shaft under the function of the spring, the action converter comprising a push arm disposed operatively in contact with the tensioner for imparting the thrust force thereto, all of the above constituent elements are housed within a gear case.

11 Claims, 12 Drawing Figures

VARIABLE-SPEED BICYCLE

BACKGROUND AND SUMMARY OF THE INVENTION

This invention relates to a variable-speed bicycle, and more particularly to the type of a bicycle equipped with a multi-stage freewheel assembly and a cooperating rear deraileur.

As is well known, a conventional multi-stage freewheel assembly having four or more sprocket wheels is too large in dimension to be housed within a conventional gear case. Further, a conventional rear derailleur is also too large in dimension to be housed in a gear case of a conventional size because of difficulty in designing its chain shifting mechanism to be compact and thin without destroying the desired function of the rear derailleur. It is, of course, possible to provide such a large gear case as specially designed for housing both the conventional multi-stage freewheel assembly and rear derailleur of large dimensions. However, a bicycle equipped with such a large gear case will surely not be aesthetically attractive and will not sell well. Therefore, it has been customary that a bicycle equipped with a rear derailleur is never provided with a full-cover type gear case. This ignores a need which arises, for example, from such viewpoints as prevention of exposure to rain and dust, and danger of catching a cyclist's clothing. The inventor is not aware of any prior art proposing a bicycle having a rear derailleur housed within a gear case.

It is, therefore, a primary object of the present invention to provide a bicycle having a two or three-stage freewheel assembly and a rear derailleur both housed within a gear case.

Another object of the invention is to provide a specific construction of a rear derailleur capable of being housed within a gear case.

A further object of the invention is to provide a novel rear derailleur which is relatively simple in construction, compact in size, inexpensive to manufacture and efficient in use.

Other objects, features and advantages of the invention will become apparent from the detailed description given hereinafter in connection with the accompanying drawings. It should be understood, however, that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
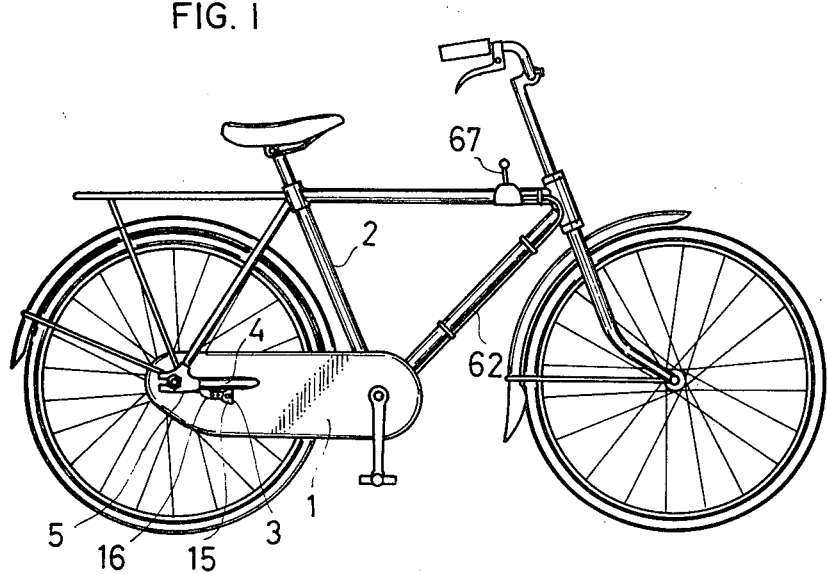
FIG. 1 is a side elevation of a bicycle embodying the present invention.

Referring now to the drawings, first in particular to FIGS. 1 to 8, a bicycle according to the present invention has a full-cover type gear case 1 mounted to one side of a bicycle frame 2, in a conventional manner. The case 1 has a side opening 3 from which a part of a known chain stay 4, a rear end plate 5, and a part (side plate 15) of a derailleur mounting bracket 13 are exposed for permitting access thereto for adjustment and maintenance. The case 1 may have a conventional internal dimension (D) in FIG. 3, the value of (D) usually being about 24 mm.

Within the case 1 a two-stage freewheel assembly 6 is disposed having a top gear sprocket 7a and a low gear sprocket 7c, and an endless chain 8 (shown in phantom line) engageable, alternatively, with said sprockets 7a, 7c. The freewheel assembly 6 is conventionally mounted on a rear wheel hub 9 for coaxial rotation therewith. A rear derailleur 10 is also disposed within the case 1 so as to cooperate with the freewheel assembly 6.

The derailleur 10 has a support shaft 11 extending transversely of the longitudinal axis of the case 1, in other words, in parallel to a hub spindle 9'. The shaft 11 is rigidly secured at its threaded end section 12 to a mounting bracket 13 by means of a lock nut 14.

Figure 2:
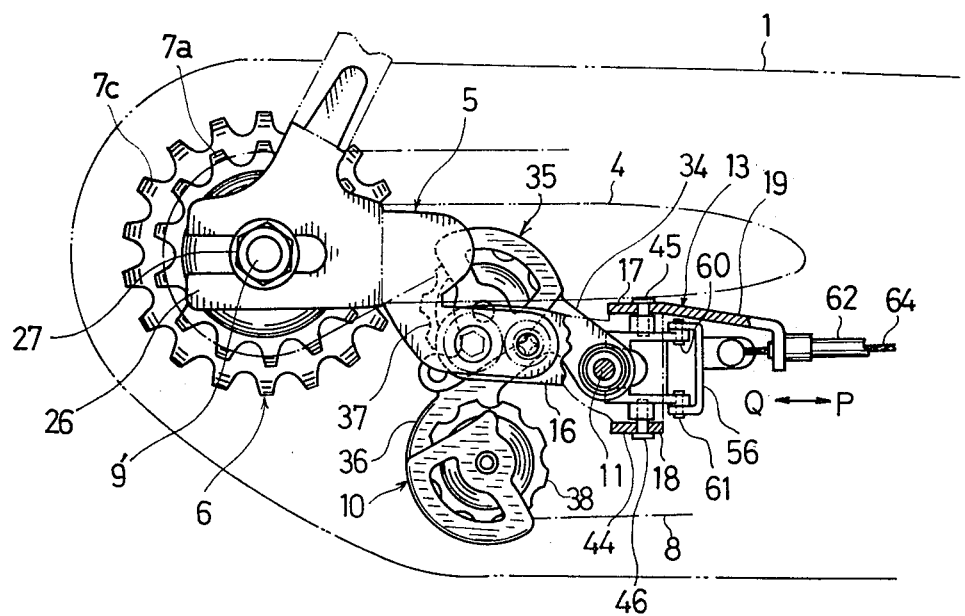
FIG. 2 is an enlarged side elevation showing the internal arrangements disposed within a gear case.
Figure 3:
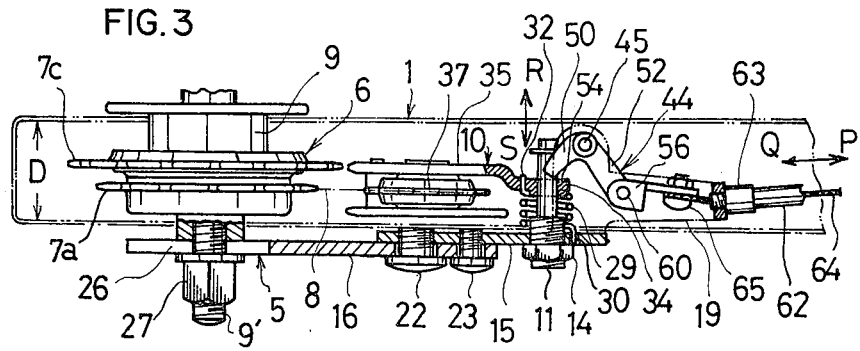
FIG. 3 is a plan view of FIG. 2, showing the derailleur in top gear position.
Figure 4:
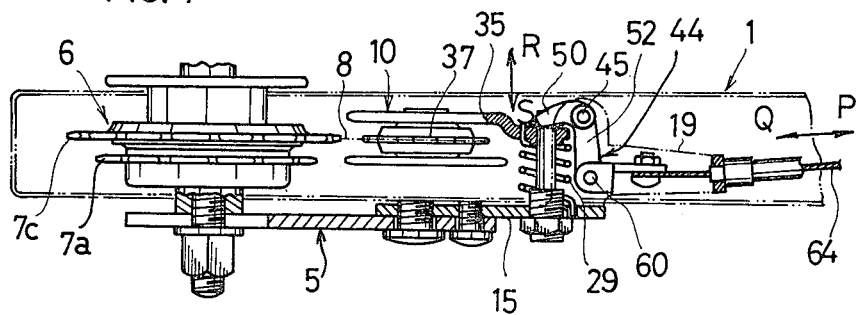
FIG. 4 is a similar view to FIG. 3, showing the derailleur in low gear position.

The bracket 13 includes a vertical side plate 15 exposed through said opening 3 of the case 1 and supported by an extension 16 of the rear end plate 5. The bracket further includes a pair of vertically spaced support arms 17, 18 extending into the case 1 at right angles from said side plate 15, and a control tube support 19 extending transversely of the shaft 11. The support 19 may extend from any one of the arms 17, 18 or from said side plate 15. The bracket 13 is mounted to the extension 16 by means of bolts 22, 23 inserted into threaded holes 20, 21 formed in said plate 15 and fixing holes 24, 25 formed in said extension 16. The rear end plate 5 is fixedly mounted to the hub spindle 9' by means of a hook 26 and a clamp nut 27 as shown in FIGS. 2 to 4.

The side plate 15 has a further threaded hole 28 through which the support shaft 11 is inserted. The threaded section 12 of the shaft 11 is engaged with the hole 28 and clamped by the lock nut 14.

Figure 6:
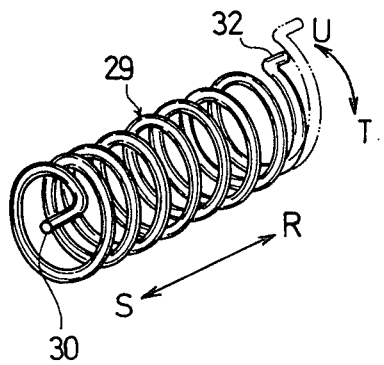
FIG. 6 is an enlarged perspective view of a helical spring to be incorporated with the derailleur.
Figure 7:
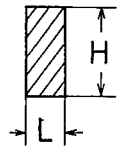
FIGS. 7 and 8 are cross sections of preferable wire materials of the helical spring as shown in FIG. 6.
Figure 8:
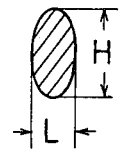

A helical spring 29 surrounds the shaft 11, with its stationary end 30 engaged with a retaining bore 31 formed in the side plate 15, while its movable end 32 is engaged with a retaining bore 33 formed in a swing arm 34 of a tensioner 35 which is pivotally and axially slidably mounted on the shaft 11. The spring 29 may be either a cylindrical helical spring as best shown in FIG. 6 or a known conical helical spring (not shown). The spring 29 may preferably be a compression spring of left-handed fashion whose movable end 32 normally exerts a torsional force in the direction T as shown in FIG. 6. The spring may be circular in cross section as shown in FIG. 6. More preferably, however, the spring may be rectangular or elliptical in cross section in which the vertical length (H) is larger than the horizontal length (L) as shown in FIGS. 7 and 8, so that said torsional force is increased to a greater extent.

The tensioner 35 comprises the swing arm 34, a pulley support frame 36 formed integral with said arm 34, and a pair of pulleys 37, 38. The frame 36 includes a guide pulley guard 39 for rotatably supporting a guide pulley 37 and a tension pulley guard 40 for rotatably supporting a tension pulley 38. One end of the swing arm 34 may preferably be provided with a boss 41 for receiving the non-threaded end of the shaft 11, so that the tensioner 35 can be easily slidable axially back and forth on the shaft 11. The boss also assists the tensioner to rotate about the shaft 11.

The spring 29 is mounted on the shaft 11 so that it always exerts a resilient axial force in the direction R as will be hereinafter described in detail. After the spring 29 and the tensioner 35 have been mounted in position on the shaft 11, a usual snap ring 42 is fitted into an annular groove 43 formed in the non-threaded end of the shaft 11 which projects out of the tensioner 35, so that the tensioner is prevented from dislocation.

Between the pair of vertically spaced support arms 17, 18 is interposed an action converter 44 which converts a tension force in the direction P into a thrust force in the direction S. The converter is movable horizontally about a vertical axis X (FIG. 5) common to a pair of hinge bolts 45, 46 each inserted into holes 47, 48 formed in the arms 17, 18 and a hole 49 formed in the converter, respectively. The converter 44 has a pair of vertically spaced push arms 50, 51 and a pair of vertically spaced connecting arms 52, 53 extending at suitable angles to said pair of push arms 50, 51.

The forward end portion of each of the push arms 50, 51 is operatively in contact with the external vertical wall surface 54 (FIG. 3) of the swing arm 34. The pair of connecting arms 52, 53 each having a hole 55 is linked to a hinge member 56 which is provided with a pair of vertically spaced horizontal arms 57, 58 each having a hole 59 and interposed between the pair of connecting arms 52, 53 so as to freely rotate horizontally about a vertical axis Y (FIG. 5) common to a pair of vertical hinge pins 60, 61 each inserted through the holes 55, 59.

One end of a conventional control tube 62 is rigidly connected to the free end of the support arm 19 by a conventional fitting means 63, while one end of a conventional control cable 64 passing through said tube 62 is rigidly connected to the hinge member 56 through a conventional clamping means 65 secured thereto.

In operation, when the cable 64 is pulled in the direction P by operating a known speed change lever 67 (FIG. 1), the connecting arms 52, 53 of the converter are also pulled in the same direction. Simultaneously therewith, the tensioner 35 is pushed by the arms 50, 51 so as to slide axially on the shaft 11 in the direction S to take the top gear position of FIG. 3, while the spring 29 is compressed with the result that, as a nature of a left-handed helical spring, its torsional force of direction T is increased so that the movable end 32 thereof can apply said force to the swing arm 34. Accordingly, the tensioner is pivotally moved clockwise about the shaft 11 to take the position of FIG. 2, thereby to automatically maintain a desired chain tension.

On the other hand, when the cable 64 is loosened, the thrust force by the arms 50, 51 are removed, so that the spring 29, which has been compressed, is permitted to stretch axially to push the tensioner in the direction R to the low gear position of FIG. 4. At this stage, the chain tension is increased because the sprocket 7c with which the chain is engaged is larger, whereby the tensioner is slightly shifted counterclockwise.

Figure 9:
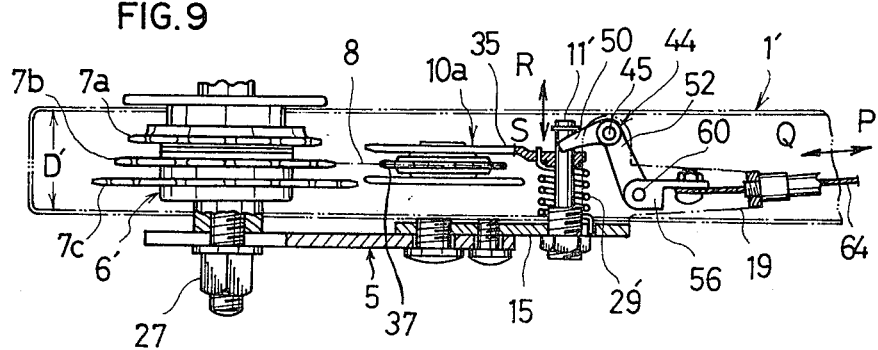
FIG. 9 is a similar view to FIG. 3, showing another embodiment of the present invention.
Figure 5:
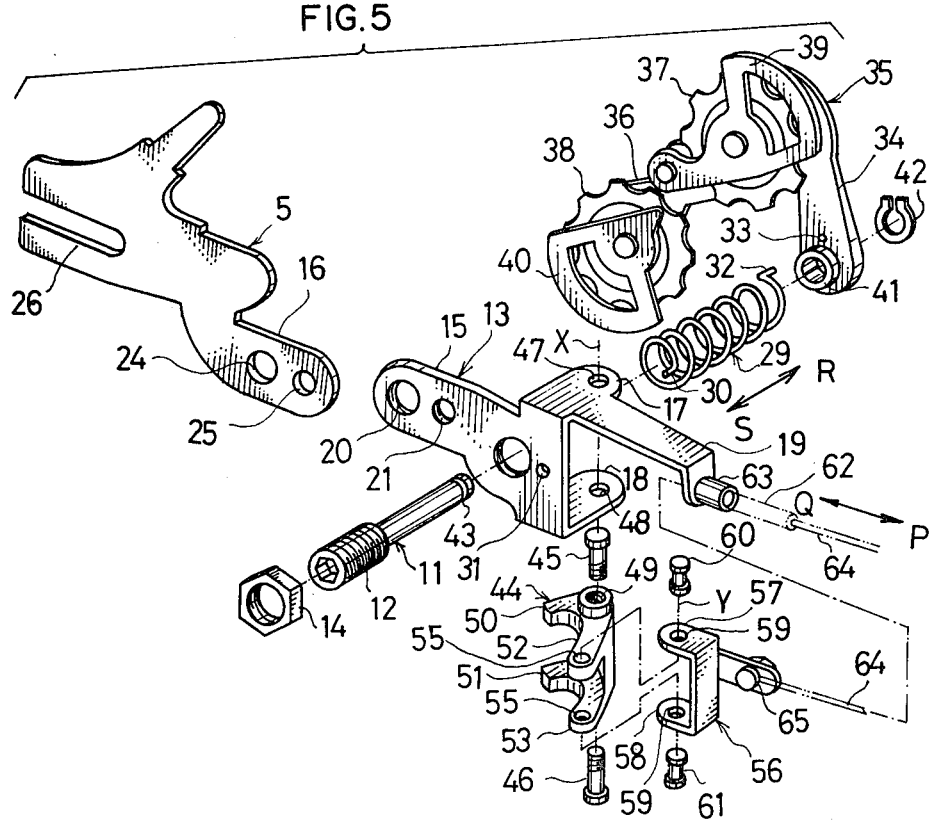
FIG. 5 is an exploded perspective view showing important elements of the invention.

FIG. 9 shows another embodiment of the invention wherein a three-stage freewheel assembly 6' and a rear derailleur 10a are disposed within a gear case 1'. The freewheel assembly 6' has three sprockets 7a, 7b, 7c among which the smallest one is a top gear, the intermediate one is a middle gear, and the largest one is a low gear. Further, the sprockets 7a, 7b, 7c are arranged in the reverse order, as will be apparent when comparing FIG. 9 with FIGS. 3, 4. The derailleur 10a is so constructed that it assumes the middle gear position when the cable 64 is half loosened or half pulled, as shown in FIG. 9.

Thus, in operation, when the cable 64 is fully pulled in the direction P, the push arms 50, 51 push the tensioner 35 in the direction S, so that the chain 8 is switched over from the intermediate sprocket 7b onto the largest sprocket 7c, whereby the low gear position is obtained.

In contrast thereto, when the cable 64 is fully loosened, the push arms 50, 51 stop pushing the tensioner 35, resulting in that the spring 29' is free to stretch, urging the tensioner in the direction R. Simultaneously therewith, the chain 8 is switched over from the intermediate sprocket 7b onto the smallest sprocket 7a, whereby the top gear position is attained. Incidentally, it may be necessary to slightly increase the internal dimension (D') (FIG. 9) of the gear case 1', since it should accommodate the three sprockets of freewheel assembly 6'. However, it will be easily understood that a slight increase in the dimension (D') will not detract from the appearance of the bicycle.

Figure 10:
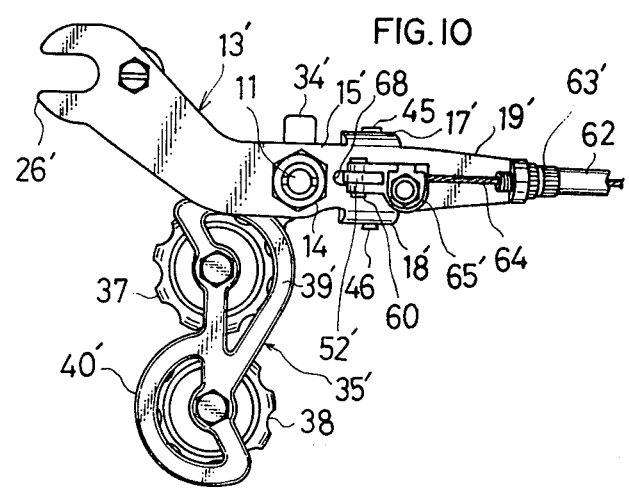
FIG. 10 is a side elevation showing a further embodiment of the invention.
Figure 11:
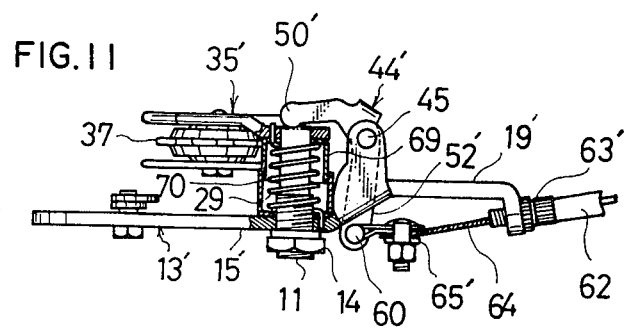
FIG. 11 is a top plan view of FIG. 10.
Figure 12:
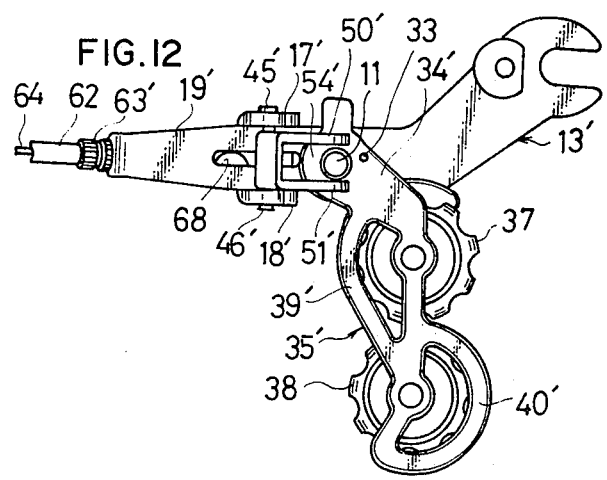
FIG. 12 is a rear side elevation of FIG. 10.

FIGS. 10 to 12 illustrate a further modification of the derailleur generally designated by reference numeral 10b, wherein a modified mounting bracket 13' is provided. The bracket 13' is a single piece of metal having a hook 26', a vertical side wall 15', a pair of vertically spaced support arms 17', 18' and a control tube support 19' extending from the side wall 15'. By means of the hook 26', the derailleur 10b can be fixedly mounted directly to the hub spindle 9'. As a result, the rear end plate 5 employed in the preceding embodiments is unnecessary. Apparently, the vertical wall 15' performs substantially the same function as the side plate 15 of the preceding embodiments. Functions of the support arms 17' 18' and the control tube support 19' are substantially the same as those of the arms 17, 18 and the support 19, respectively.

The pair of connecting arms 52, 53 in the preceding embodiments may be modified into a single piece or arm 52' as best shown in FIG. 10. The connecting arm 52' is rigid at one end to the action converter 44', extends through a slot 68 formed in a wall of the bracket 13', and is pivotally supported at the other end by a hinge pin 60 to which the cable 64 is directly connected. Thus, in this embodiment, the hinge member 56 employed in the preceding embodiments may be dispensed with.

The shaft 11 and the spring 29 are disposed within a pair of cylindrical casings 69, 70 for providing a dust-free environment. One casing 69 is arranged in telescopical and rotatable relationship with respect to the other casing 70, so that the tensioner 35 is rotatable and axially slidable with the casing 69.

Various reference numerals with a prime are used in FIGS. 10 to 12 to indicate the various elements which carry out substantially the same functions as those of the same or like elements already described in detail in the foregoing and indicated by identical reference numerals without a prime. Thus, a detailed description of each of such elements which are the same as or similar to those corresponding elements already described in detail is omitted here.

The operation of the derailleur 10b shown in FIGS. 10 to 12 is substantially the same as that of the derailleur 10 shown in FIGS. 2 to 5. Further, the derailleur 10b may be modified so as to carry out substantially the same function as that of the derailleur 10a shown in FIG. 9.

The present invention being thus described, it will be obvious that same may be varied in many ways. Such variations are not to be regarded as a departure from the spirit and scope of the present invention, and all such modifications as would be obvious to one skilled in the art are intended to be included within the scope of the following claims.

I claim:

1. A variable-speed bicycle having a gear case mounted to one side of a bicycle frame, said bicycle comprising:
   a multi-stage freewheel assembly housed within said gear case;
   said freewheel assembly having at least two sprockets of different diameter mounted on a rear wheel hub of said bicycle;
   a rear derailleur housed within said gear case;
   said derailleur having a tensioner, a pulley support frame formed integral with said tensioner, and a pair of pulleys rotatably supported by said pulley support frame;
   said derailleur being adapted to cooperate with said freewheel assembly for switching over a drive chain from one sprocket to another sprocket when said tensioner is shifted by operation from a remote location by means of a speed change lever through a control cable both of which are mounted on said bicycle frame;
   said derailleur including a substantially horizontal support shaft disposed within said gear case and extending transversely with respect to a longitudinal axis of said gear case;
   said tensioner being axially slidable on said support shaft as well as rotatable about said support shaft;
   at least one helical spring surrounding said support shaft and engaged at its movable end with said tensioner to bias said tensioner to slide on said support shaft axially outwardly as well as to impart a torsional force to said tensioner to urge the tensioner to rotate about said support shaft in one direction;
   said derailleur further including an action converter for converting an axial tension force imparted in a first direction by said control cable into a thrust force acting in a second direction transverse to said first direction of said tension force; and
   said action converter having at least one push arm connected at its one end to said control cable and arranged to be in contact at its free end with said tensioner to selectively position said tensioner on said support shaft in accordance with said tension force imparted by said control cable.

2. The bicycle as set forth in claim 1, wherein said freewheel assembly comprises two sprockets, a first larger diameter sprocket and a second smaller diameter sprocket; and
   said freewheel assembly is arranged so that said drive chain is engaged with said smaller diameter sprocket when said tensioner is pushed by said push arm so as to fully compress said helical spring.

3. The bicycle as set forth in claim 1, wherein said freewheel assembly comprises two sprockets, a first larger diameter sprocket and a second smaller diameter sprocket; and
   said freewheel assembly is arranged to engage said drive chain with said larger diameter sprocket when said tensioner is pushed by said push arm so as to fully compress said helical spring.

4. The bicycle as set forth in claim 1, wherein said freewheel assembly comprises three sprockets of different diameters, a largest diameter sprocket, an intermediate diameter sprocket, and a smallest diameter sprocket, which are arranged in order of diameter; and
   said freewheel assembly is arranged to engage said drive chain with said smallest diameter sprocket when said tensioner is pushed by said push arm so as to fully compress said helical spring.

5. The bicycle as set forth in claim 1, wherein said freewheel assembly comprises three sprockets of different diameters, a largest diameter sprocket, an intermediate diameter sprocket, and a smallest diameter sprocket, which are arranged in order of diameter; and
   said freewheel assembly is arranged to engage said drive chain with said largest diameter sprocket when said tensioner is pushed by said push arm so as to fully compress said helical spring.

6. The bicycle as set forth in claim 1, wherein said horizontal support shaft is supported by a mounting bracket which is mounted to a rear end plate fixedly mounted on said rear wheel hub spindle.

7. The bicycle as set forth in claim 1, wherein said horizontal support shaft is supported by a mounting bracket which is directly mounted to said rear wheel hub spindle.

8. The bicycle as set forth in claim 1, wherein said action converter is supported by said mounting bracket.

9. The bicycle as defined in claim 1, wherein said action converter comprises at least one connecting arm connected at its one end to said push arm and at its other end to said control cable.

10. The bicycle as defined in claim 1, wherein said action converter comprises at least one connecting arm connected at its one end to said push arm and linked at its other end to a hinge member to which said control cable is connected.

11. A derailleur for use in combination with a variable-speed bicycle having a gear case mounted to one side of a bicycle frame, said derailleur comprising:
    a rear derailleur housed within said gear case;
    said derailleur having a tensioner, a pulley support frame formed integral with said tensioner, and a pair of pulleys rotatably supported by said pulley support frame;
    said derailleur being adapted to cooperate with a multi-stage freewheel assembly positioned within said gear case for switching over a drive chain from one sprocket to another sprocket when said tensioner is shifted by operation from a remote location by means of a speed change lever through a control cable;

said derailleur including a substantially horizontal support shaft disposed within said gear case and extending transversely with respect to a longitudinal axis of said gear case;

said tensioner being axially slidable on said support shaft as well as rotatable about said support shaft;

at least one helical spring surrounding said support shaft and engaged at its movable end with said tensioner to bias said tensioner to slide on said support shaft axially outwardly as well as to impart a torsional force to said tensioner to urge the tensioner to rotate about said support shaft in one direction;

said derailleur further including an action converter for converting an axial tension force imparted in a first direction by said control cable into a thrust force acting in a second direction transverse to said first direction of said tension force; and said action converter having at least one push arm connected at its one end to said control cable and arranged so as to be in contact at its free end with said tensioner to selectively position said tensioner on said support shaft in accordance with said tension force imparted by said control cable.

* * * * *